J. WEED.
Cider-Mills.

No. 198,476.   Patented Dec. 25, 1877.

Witnesses:
James Martin Jr.
J. Theodore Lang.

Inventor.
James Weed
by
Mason, Fenwick & Lawrence

UNITED STATES PATENT OFFICE.

JAMES WEED, OF MUSCATINE, IOWA.

IMPROVEMENT IN CIDER-MILLS.

Specification forming part of Letters Patent No. 198,476, dated December 25, 1877; application filed June 21, 1877.

*To all whom it may concern:*

Be it known that I, JAMES WEED, of the city and county of Muscatine, in the State of Iowa, have invented a new and useful Improvement in Cider-Mills, which improvement is fully set forth in the following specification and drawings, in which latter—

Figure 1:
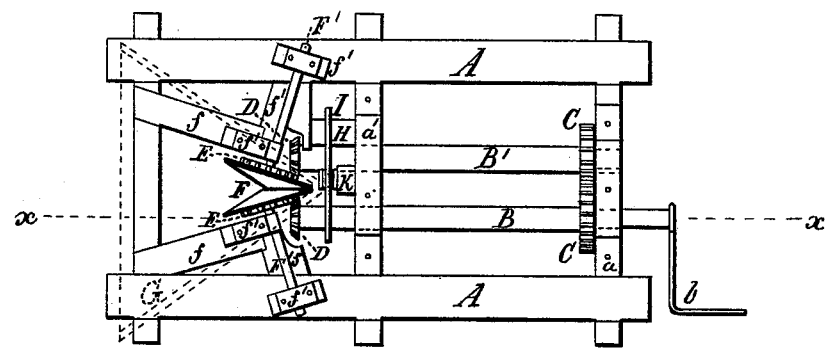
Figure 2:
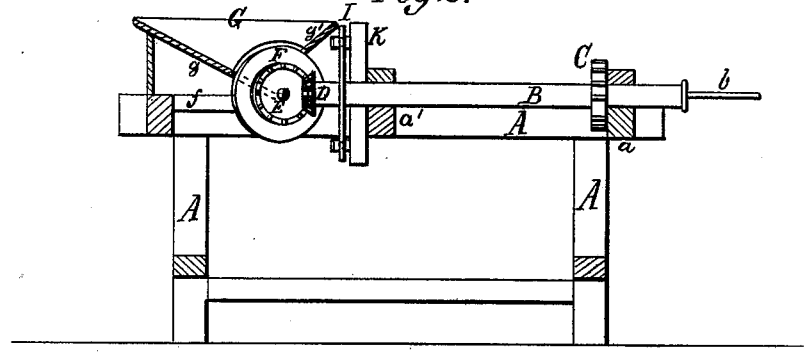
Figure 3:
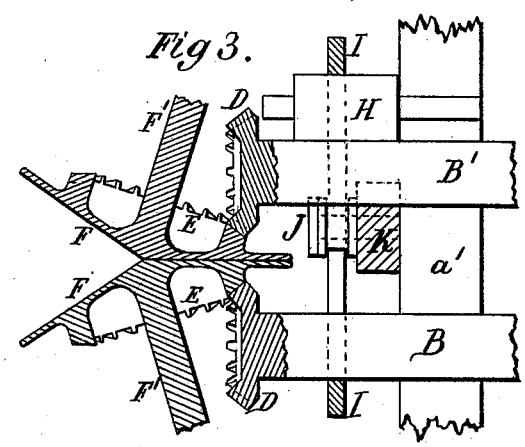
Figure 4:
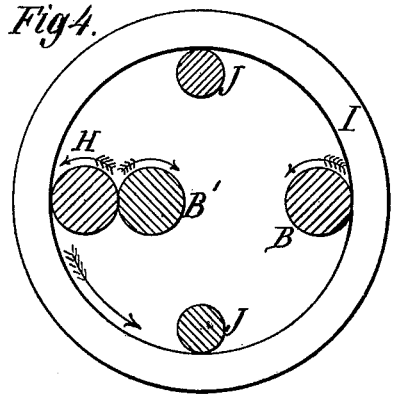

Figure 1 is a plan view, representing my improved cider-mill. Fig. 2 is a vertical section of the same in the line $x\ x$ of Fig. 1. Fig. 3 is an enlarged and partly-sectional view of the main operating parts of the machine; and Fig. 4 is a diagram, illustrating the operation of the anti-friction ring, reversing-roller, guides, and gear-shafts used in my improved cider-mill.

The nature of my invention consists in certain constructions, combinations, and arrangements of parts, hereinafter described and specifically claimed, whereby an improved cider-mill of simple construction and great effectiveness is produced.

In the drawings, A represents a suitable frame, which supports two strong shafts, B B', of which the former, B, projects beyond the end of the frame A, and is there provided with a crank, $b$. The shafts B B' are parallel, or very nearly so, for reasons hereinafter explained, and at the inside of the cross-bar $a$ they are provided with gear-wheels C, of equal sizes, which mesh into one another, and thus cause the said shafts to revolve in opposite directions. The cross-beam $a$ is provided with suitable bearings for the outer ends of the shafts B B'. Another cross-beam, $a'$, provided with suitable bearing-boxes, supports the inner ends of the shafts, which are at their extremities each provided with a conical or bevel-gear wheel D. The conical or bevel wheels D gear into two bevel or conical geared rims, E, which are, respectively, on the backs of two hollow crushing-cones, F. The shaft F' of the cones F are supported by angular bars $f$, firmly attached to the frame A, being secured in ordinary bearing-boxes $f'$. The cones F meet in a line parallel to the shafts B B', on that side of their axes where they are operated by the said shafts. A triangular hopper, G, is placed over the two cones F, having a bottom which is inclined toward the vertices of the said cones and sides $g'$, which are sufficiently projecting above the cones F to prevent them from carrying the fruit over the hopper.

In order to avoid the excessive wear of the bearings and shafts which run in them, created by the resistance which tends to spread the cones F apart, and thereby force the inner ends of the shafts B B' apart and out of their parallelism while the machine is operating, I use an anti-friction device, by which the direct friction upon the bearings and shafts is changed from a sliding to a rolling one. The said device consists of a horizontal reversing friction-roller, H, having suitable stationary bearings and boxes arranged to bear against the shaft B', outside of the two shafts B B', and in the same plane with them, and of a stout movable ring, I, the inner surface of which closely encircles the roller H and shaft B, and of suitable supporting and guiding rollers J, arranged horizontally on a rigid vertical bar, K, directly over each other, one above and the other below the shafts. The roller H, by being pressed against by the shaft B', revolves in the same direction as the shaft B, and thus the ring I is moved in the same direction as shaft B and roller, all of which motions are indicated by arrows in the diagram, Fig. 4.

The ring I is so constructed as to take up the strain caused by the crushing substances between the crushing-cones.

To effect the said difference of rolling friction I make the bearings of the shafts B B' in the cross-bar $a'$ slightly yielding, and leave a little play between the ring, shafts, and reversing-roller.

Having described my invention, what I claim as new, and desire to secure by Letters Patent, is—

1. The combination of the cones F F, beveled or conical toothed rims E E, the parallel shafts B B', bevel or conical wheels D D, and spur-wheels C C, substantially in the manner and for the purpose described.

2. The combination, with the crushing devices, of a ring, I, shafts B B', and reversing-roller H, substantially as and for the purpose set forth.

3. The combination, with the crushing devices, of the roller H, ring I, and guide-rollers J, substantially as set forth.

Witness my hand in the matter of my application for a patent for an improved cider-mill this 18th day of June, A. D. 1877.

JAMES WEED.

Witnesses:
LYMAN BANKS,
GEO. WHICHER.